(12) United States Patent
Manbeck

(10) Patent No.: US 7,046,909 B2
(45) Date of Patent: May 16, 2006

(54) SYSTEM AND METHOD FOR IDENTIFYING INCONSISTENCIES IN DUPLICATE DIGITAL VIDEOS

(75) Inventor: Kevin Manbeck, Cranston, RI (US)

(73) Assignee: MTI Film, LLC, Providence, RI (US)

( * ) Notice: Subject to any disclaimer, the term of this patent is extended or adjusted under 35 U.S.C. 154(b) by 1005 days.

(21) Appl. No.: 09/729,667

(22) Filed: Dec. 4, 2000

(65) Prior Publication Data

US 2001/0031128 A1    Oct. 18, 2001

Related U.S. Application Data

(60) Provisional application No. 60/168,927, filed on Dec. 3, 1999, provisional application No. 60/194,250, filed on Apr. 3, 2000.

(51) Int. Cl.
*H04N 5/93* (2006.01)

(52) U.S. Cl. .......................................... 386/52; 386/54

(58) Field of Classification Search ................. 386/46, 386/52, 55, 54, 95, 112; 382/236
See application file for complete search history.

(56) References Cited

U.S. PATENT DOCUMENTS

| | | | |
|---|---|---|---|
| 3,805,284 A | 4/1974 | Coon, Jr. et al. | 360/15 |
| 4,345,312 A * | 8/1982 | Yasuye et al. | 382/151 |
| 4,727,509 A | 2/1988 | Johnson et al. | 364/900 |
| 5,126,990 A | 6/1992 | Efron et al. | 369/58 |
| 5,233,477 A | 8/1993 | Scheffler | 360/15 |
| 5,260,800 A | 11/1993 | Sturm et al. | 358/310 |
| 5,892,633 A | 4/1999 | Ayres et al. | 360/73.08 |
| 6,560,366 B1 * | 5/2003 | Wilkins | 382/236 |

FOREIGN PATENT DOCUMENTS

| | | |
|---|---|---|
| DE | 4124378 A1 | 1/1993 |
| DE | 4200920 A1 | 7/1993 |
| EP | 0309639 A2 | 9/1982 |
| EP | 0309639 A3 | 9/1982 |
| EP | 0509728 A2 | 4/1992 |

OTHER PUBLICATIONS

Toshiaki, Fujimaki "Error Display Method for Automatic Dubbing Machine", Patent Abstracts of Japan, vol. 016, No. 430, p. 1417, Sep. 9, 1992.
PCT/ISA/210 International Search Report, PCT/US00/32838, Feb. 28, 2001.

* cited by examiner

*Primary Examiner*—Huy Nguyen
(74) *Attorney, Agent, or Firm*—Bromberg & Sunstein LLP

(57) ABSTRACT

A system for checking the consistency between a digital video master and a duplicate video. Both the digital video master and the duplicate digital video have digital data, the digital data composed of a plurality of data segments. A loader module receives the digital data of the digital video master and the duplicate digital video. A comparison module then retrieves the digital data of the digital video master and the duplicate digital video and performs a data segment by data segment comparison between the digital data of the digital video master and the digital data of the duplicate digital video. The comparison module indicates any discrepancies between the digital video master and the duplicate digital video.

58 Claims, 3 Drawing Sheets

SYSTEM AND METHOD FOR IDENTIFYING INCONSISTENCIES IN DUPLICATE DIGITAL VIDEOS

PRIORITY

This application claims priority from U.S. provisional patent application Ser. No. 60/168,927, filed Dec. 3, 1999, entitled "System and Method for Identifying Inconsistencies in Duplicate Digital Video", the disclosure of which is incorporated herein by reference, and U.S. provisional patent application Ser. No. 60/194,250, filed Apr. 3, 2000, entitled "System and Method for Identifying Inconsistencies in Duplicate Digital Videos", the disclosure of which is incorporated herein by reference.

TECHNICAL FIELD

The present invention relates to digital media and, more specifically, to error identification in digital video

BACKGROUND ART

A DVM, or digital video master, usually in the form of digital tape and usually containing an accompanying digital audio track, is commonly the end result of the process of creating material for visual display with electronic devices. The original source of the material might be film, video, computer-generated or any other medium for capturing visual and audio data. Typically, the original material has been processed in a variety of formats during post production, including, but not limited to, ordinary editing, the introduction of fades and other special effects, color correction, and audio adjustments. The DVM is the digital video representation of the visual and audio material in a form suitable for commercial release, or perhaps at some important junction prior to final release.

Generally, more than one copy of the DVM is required. For example, when film material is brought to a post-production house for transfer to video, editing, audio work, etc., the client may eventually wish to have several copies of the DVM. Other situations in which multiple copies are necessary include archiving and sending copies to multiple locations and distributors. It is therefore necessary to create physical copies of the DVM, and it is desirable that each copy, or "dub," be the same. Indeed, in principle, each copy should be an exact replication of the original DVM.

Due to imperfections in standard, tape-based reproduction processes, it is often the case that some differences exist between each individual copy and the original. The principal reason is that the electronic machines which process digital tape operated at very high speeds and occasionally make faulty recordings causing random errors in the duplicate. When the digital data is derived from a computer based source, pixel noise may occur and cause errors. Some mistakes, e.g., small changes in the color values in isolated locations, are relatively benign in the sense that the copy is visually indistinguishable from the original by a typical viewer. Other alterations are more serious, such as dropping a number of lines or an entire field (each video frame consists of two half-frames called fields, a field consisting of every other horizontal line so that the first field contains the even lines of the frame and the second field contains the odd lines of the frame), or introducing a sustained stretch of visual or audio noise or artifacts.

One current solution is manually intensive quality control. Each copy of the DVM is carefully checked by a trained specialist. The operator watches the video material on a monitor, perhaps at reduced speed, and might step through the material frame-by-frame in suspect sections. The operator then decides whether or not to accept the copy as a faithful reproduction. A similar process may also be performed on an audio track.

SUMMARY OF THE INVENTION

In a first embodiment, a system for checking the consistency between a digital video master, which may include an audio track, and a duplicate digital video is provided. The digital video master and the duplicate digital video are each composed of digital data where the digital data is composed of a plurality of data segments. Each data segment may be a bit of data, a line of data in a field, a frame of video data, a section of audio track, or any other grouping of data. The digital data of the digital video master and the duplicate digital video are loaded from the source into a loader module. The loader module itself may store the digital data, or the loader module may transfer the digital data to a memory location. The system further includes a comparison module that retrieves the digital data of the digital video master and the duplicate digital video and performs a data segment-by-data segment comparison. Discrepancies between the digital video master and the duplicate digital video are indicated, such as by the length of time of the discrepancy or by categorizing the type and severity of the discrepancy.

In other embodiments of the invention, the comparison module indicates only those discrepancies above a threshold. The threshold may be based upon time duration of the discrepancy, or upon spatial relationships between discrepancies, such as proximity of discrepancies within a line, field, or frame of video. The threshold may also be based upon viewer perceptibility standards, or the variance in intensity level of the discrepancy. The comparison module may annotate discrepancies in a log file. The system may also have a user interface for accessing and viewing the indicated discrepancies. The user interface may allow for selecting an annotated discrepancy and viewing or listening to that portion of the duplicate video having the annotated discrepancy, or the corresponding portion of the digital video master.

In other embodiments of the invention, a method and a computer program product for inspecting a duplicate digital video tape created from a digital video master tape is provided. The digital video master tape and the duplicate digital video tape each contain digital data and the digital data is loaded into memory associated with a processor. The digital data of the master video tape is compared to the digital data of the duplicate video tape in the processor. The discrepancy in data between the digital data of the master video tape and the duplicate video tape is then identified and indicated, for example, by the time of each discrepancy or by categorizing the type and severity of the discrepancy.

In related embodiments of the invention, only those discrepancies above a defined threshold are indicated. The threshold may be based upon time over which the data is in discrepancy, or upon spatial relationships between discrepancies, such as proximity of discrepancies within a line, field, or frame of video. The threshold may also be based upon viewer perceptibility standards or the variance in intensity level of the discrepancy. Each discrepancy may be annotated in a log file. A user controlled viewing or listening of the indicated discrepancies pertaining to video in the duplicate video may be provided.

In another embodiment of the invention, a method for copying a duplicate digital video from a digital video master and inspecting the duplicate video at substantially the same time is presented. The digital data is copied data segment-by-data segment from the digital video master to the duplicate digital video. A data segment is read from the digital video master, and then written to the duplicate digital video. The data segment is then read from the duplicate digital video and compared to the data segment read from the digital video master. Any discrepancies between the data segment read from the digital video master and the data segment read from the duplicate digital video are then determined, and an indicator is caused if any discrepancies are found. The indicator may include identifying the time of the discrepancy or categorizing the severity of the discrepancy. The indicator may include an audio alert. Further copying may be halted if a discrepancy is indicated.

In related embodiments of the invention, each data segment may be a byte representative of video. The data segment may also be representative of a line, field, or frame of video. Additionally, each data segment may represent a section of audio track. Only those discrepancies above a defined threshold may cause an indicator. The threshold may be based upon time over which the data is in discrepancy, or upon spatial relationships between discrepancies, such as the proximity of discrepancies within a line, field, or frame of video.

The threshold may also be based upon viewer perceptibility standards or the variance in intensity level of the discrepancy. Each discrepancy may be annotated in a log file. A user controlled auditory review or viewing of the indicated discrepancies in the duplicate video may be provided.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
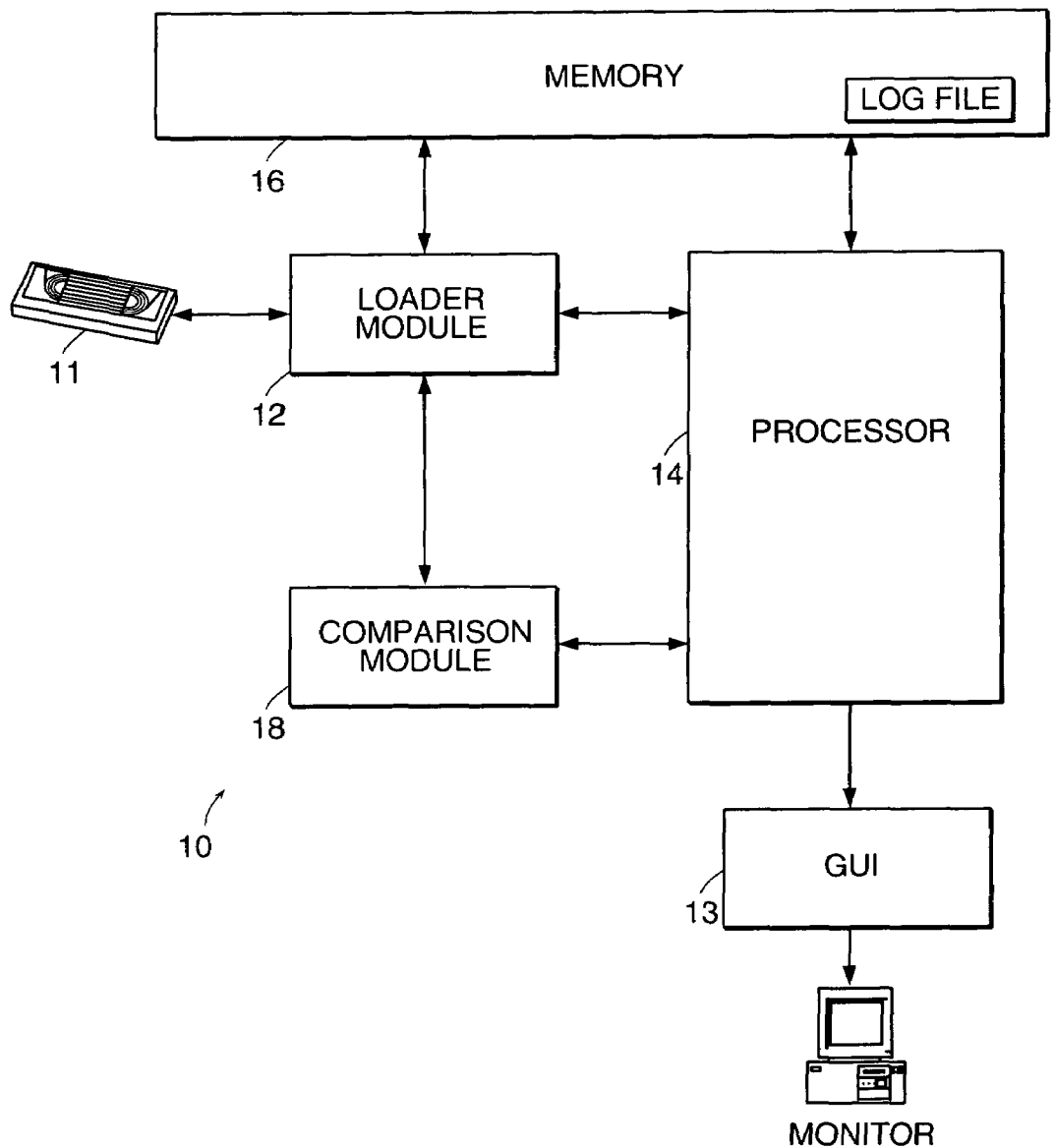
FIG. 1 is a block diagram of one embodiment of the system for identifying inconsistencies in duplicate digital video tapes.

FIG. 1 is a block diagram of a system 10 for identifying inconsistencies in a duplicate digital video tape or other media. A digital video master may be created from a variety of sources including film, video tape and computer generated images, or any combination thereof. The process of creating a digital video master requires that the source be digitized and the analog information quantized. In general, the digital video master is created through the transfer of the digital video representation of the source to some form of media such as a tape 11 or diskette. Digital data from a digital video master is loaded into a loader module 12. The loader module 12 extracts the data from the media holding the digital video master, in this embodiment, the tape 11, and in conjunction with a processor 14 stores the data into a memory 16. Similarly, the digital data from a duplicate digital video tape (not shown) is loaded into the loader module 12. The digital data of the digital master and the duplicate digital video source are compared in a comparison module 18. Discrepancies in the data are then indicated to the user and may be stored in memory 16, such as Random Access Memory (RAM) or a hard drive. Detections of discrepancies may also trigger an audible alert. In various embodiments of the invention, discrepancies are noted in a log file in the memory 16 with pointers to maintain the location of the discrepancies in the data of the duplicate digital video. The information from the log file can then be requested by a user through a graphical user interface 13 and the exact frame or frames, or the exact locations in the audio track, may be viewed or listened to by the user of the system 10 to see or hear the extent of the discrepancy. The user can then make a determination if the digital video source needs to be recopied or not without having to review the entire duplicate digital video. Alternatively, the process could be totally automated such that no user interaction is required, with, for example, the processor determining the acceptability of the duplicate digital video. Further, it should be understood by someone of ordinary skill in the art that the loader module and comparison module may be computer code operating in conjunction with the process.

Figure 2:
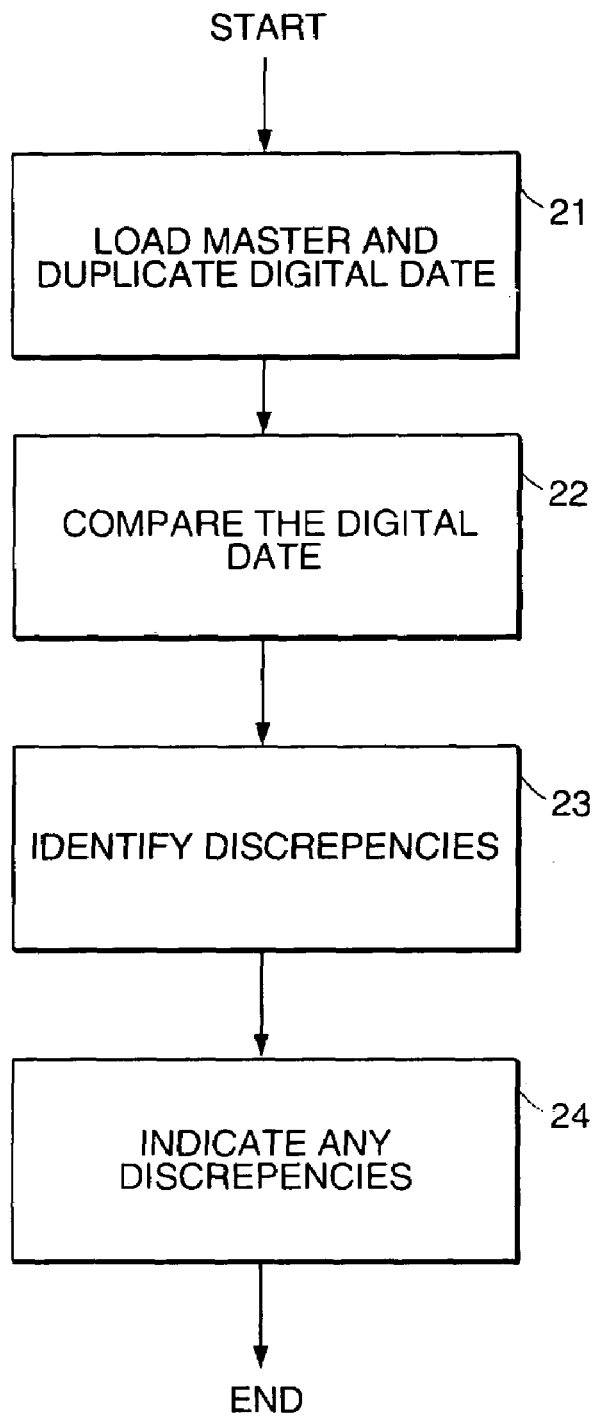
FIG. 2 is a flow chart illustrating a method for identifying inconsistencies in duplicate digital video tapes.

In accordance with an embodiment of the invention, a method for inspecting and verifying a duplicate of a DVM is presented. A flow chart of the method is shown in FIG. 2. After a copy has been made, but prior to any type of manual inspection, the raw data of both the original DVM and the copy are loaded into the memory of a computer in process 21. A file comparison of the digital data is then performed in process 22. The file comparison is at the level of the digital representation of the auditory data (usually sampled and quantized acoustic intensities) and of the visual intensity data (usually one luminance value and two chrominance values, each quantized to a dynamic range) at each pixel of each field of the video sequence. In alternative embodiments, the digital data may be representative of the NTSC analog signal with red, green, and blue components (RGB), a digital representative of the PAL or SECAM analog format, or any other digital representation of audio or video. The quantized intensity values are compared bit by bit and all differences between the two video streams are recorded. Each discrepancy is identified in process 23 and data is collected indicating the location of the discrepancy and may also include information about the extent of the discrepancy. For example, the comparison module 18 (in FIG. 1) might determine that only one pixel of a frame of video data is inconsistent, or that multiple pixels are different and the degree that the colors differ for either the luminance-bandwidth-chrominance (YUV) or RGB components of the video. In one embodiment, each discrepancy is indicated to the user in process 24 and may be annotated by indicating the location and categorizing the extent of the discrepancy in a log file which may be accessed by a user through a graphical user interface. The categorizing of the extent of the discrepancy may further include whether a single pixel, a line of pixels, or an entire field are inaccurate between the digital video master and the duplicate digital video. Similarly, the categorizing may include the interval over which the auditory data is inaccurate.

In various embodiments of the invention, a threshold routine compares the digital video master data to the duplicate digital video data, with only those discrepancies that are above a defined threshold being indicated. Thresholds may be defined by, but not limited to, spatial characteristics, the time duration of the discrepancy, viewer perceptibility, and/ or intensity level characteristics. Spatial characteristics may include the number of discrepancies in a field, or may be based on proximity, such as the distance between discrepancies in a field or frame. The time duration relates to how many continuous fields/frames contain the discrepancy. Discrepancies that are short in duration may not be noticeable. Standards for viewer perceptibility that pertain to various types of discrepancies may be used to ascertain severity. Examples of threshold levels include, but are not limited to, setting the threshold so as to allow a pixel to be off by three intensity levels before an error is indicated, as such small errors may be found to be unperceivable to a human. Or the threshold may depend on whether the discrepancies are widely dispersed in a given line, field or frame, upon which no error may be indicated, or grouped closely together, such that they become more perceivable and thus should be indicated. A three by three grouping of pixels will typically be more noticeable than nine isolated pixels in a given frame or field. The threshold level may also be simply based on the number of pixels that are in error per line, field or frame.

Figure 3:
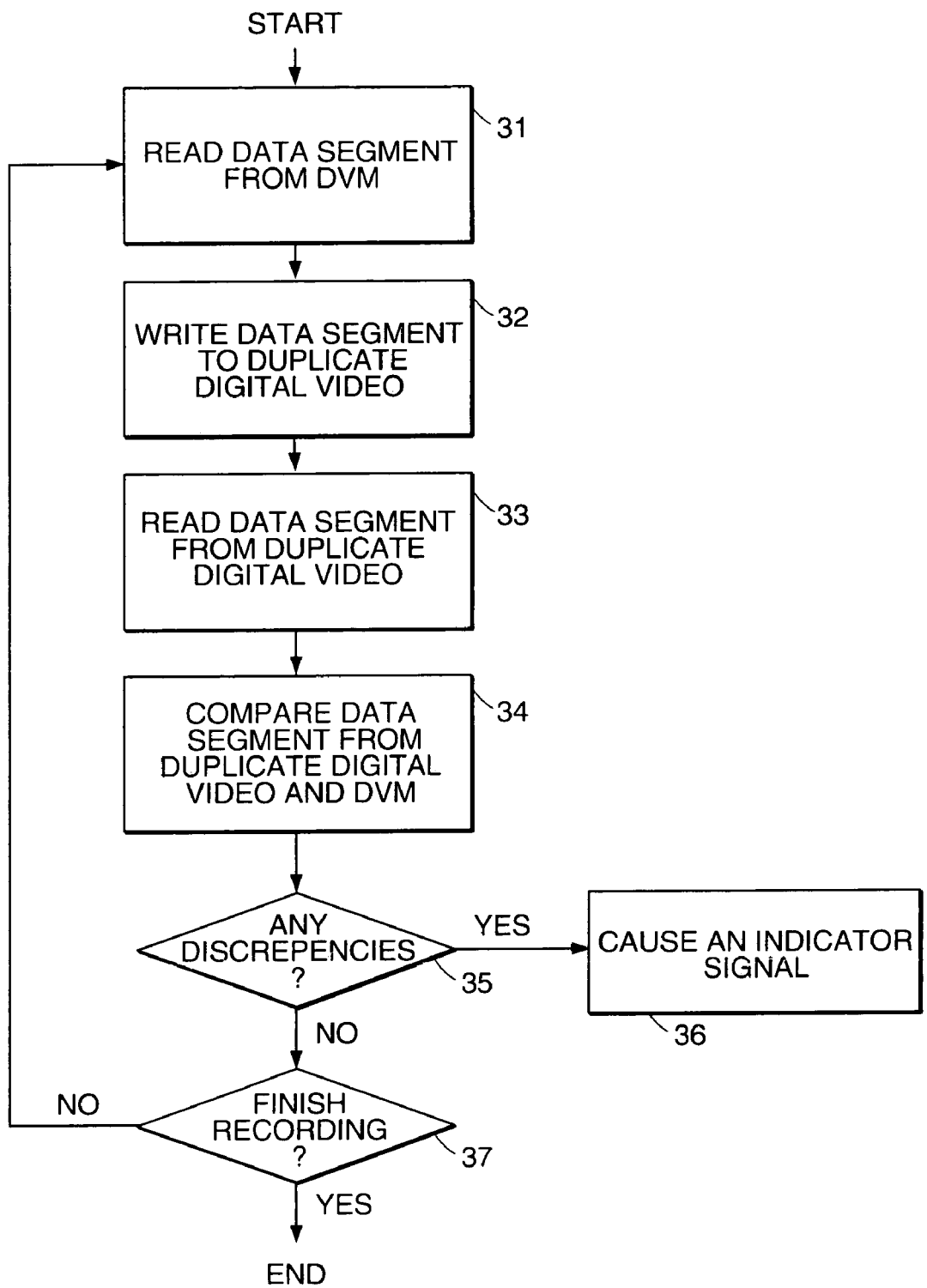
FIG. 3 is a flow chart illustrating a method for identifying inconsistencies in duplicate digital video tapes while in the process of dubbing.

The verification of the duplicate digital video may occur at substantially the same time as the copying process, as shown in FIG. 3. For example, immediately after reading a data segment from the original DVM 31 and writing the data to the duplicate digital video 32, the data segment from the duplicate DVM can be read 33 and compared 34 with the data from the original DVM. If no discrepancies are found 35, the recording process will continue until finished 37. Any discrepancies found 35 will cause an indicator signal 36, and in certain embodiments of the invention halt the recording process. In this manner, problems in the recording process can be identified quickly, allowing maintenance and repairs to be made before additional dubs are made. Various thresholds, as discussed above, may also be used.

The invention may also embody a user interface designed for an operator to visualize or hear the detected differences between the digital video master and the duplicate digital video and have access simultaneously to the errors in the log file presented as summary statistics for the duplicate digital video. In a typical scenario, the operator examines, as on a monitor, and listens to, via speakers or headphones, those areas of divergence which are above a certain threshold The operator then makes a final decision on whether to accept the copy based on artistic and other criteria. In particular, there is no need for the operator to scan the entire duplicate video; he need only focus on the detected differences. In this way, the amount of time needed for duplicate verification is substantially reduced, and it is less likely that flawed copies are accepted as duplicates.

In an alternative embodiment, the disclosed apparatus and method for identifying inconsistencies in duplicate digital video tapes may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adaptor connected to a network over a medium. The medium may be either a tangible (e.g., optical or analog communications lines) or a medium implemented with wireless techniques (e.g., microwave, infrared, or other transmission techniques). The series of computer instructions embodies all or part of the functionality previously described herein with respect to the system and method. Those skilled in the art should appreciate that such computer instructions can be written in a number of programming languages for use with may computer architectures or operating systems. Further, such instructions may be stored in any memory device, such as a semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), pre-loaded with a computer system (e.g., on system ROM or fixed disk), or distributed from a server or electronic bulletin board over a network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A system for checking the consistency between a digital video master and a duplicate video, wherein the digital video master and the duplicate digital video are each composed of digital data, the digital data composed of a plurality of data segments, the system comprising:
    a loader module for storing the digital data of the digital video master and the duplicate digital video; and
    a comparison module that retrieves the digital data of the digital video master and the duplicate digital video and performs a data segment-by-data segment comparison between the digital data of the digital video master and the digital data of the duplicate digital video, the comparison module indicating any discrepancies between the digital video master and the duplicate digital video, wherein each data segment is representative of a section of audio track.

2. A system for checking the consistency between a digital video master and a duplicate video, wherein the digital video master and the duplicate digital video are each composed of digital data, the digital data composed of a plurality of data segments, the system comprising:
    a loader module for storing the digital data of the digital video master and the duplicate digital video; and
    a comparison module that retrieves the digital data of the digital video master and the duplicate digital video and performs a data segment-by-data segment comparison between the digital data of the digital video master and the digital data of the duplicate digital video, the comparison module indicating any discrepancies between the digital video master and the duplicate digital video, wherein the comparison module annotates discrepancies in a log file.

3. A system according to claim 2, wherein the comparison module indicates discrepancies by time of the discrepancy.

4. A system for checking the consistency between a digital video master and a duplicate video, wherein the digital video master and the duplicate digital video are each composed of digital data, the digital data composed of a plurality of data segments, the system comprising:
    a loader module for storing the digital data of the digital video master and the duplicate digital video; and a comparison module that retrieves the digital data of the digital video master and the duplicate digital video and performs a data segment-by-data segment comparison between the digital data of the digital video master and the digital data of the duplicate digital video, the comparison module indicating any discrepancies between the digital video master and the duplicate digital video, wherein the comparison module indicates discrepancies by categorizing the type and severity of the discrepancy.

5. A system for checking the consistency between a digital video master and a duplicate video, wherein the digital video master and the duplicate digital video are each composed of digital data, the digital data composed of a plurality of data segments, the system comprising:
   a loader module for storing the digital data of the digital video master and the duplicate digital video;
   a comparison module that retrieves the digital data of the digital video master and the duplicate digital video and performs a data segment-by-data segment comparison between the digital data of the digital video master and the digital data of the duplicate digital video, the comparison module indicating any discrepancies between the digital video master and the duplicate digital video; and
   a user interface for accessing and viewing the indicated discrepancies.

6. A system according to claim 5, wherein the comparison module annotates discrepancies in a log file, and the user interface allows selecting an annotated discrepancy and viewing that portion of the duplicate video having the annotated discrepancy.

7. A system according to claim 6, wherein the user interface allows viewing that portion of the digital video master that corresponds to the selected annotated discrepancy.

8. A system for checking the consistency between a digital video master and a duplicate video, wherein the digital video master and the duplicate digital video are each composed of digital data, the digital data composed of a plurality of data segments, the system comprising:
   a loader module for storing the digital data of the digital video master and the duplicate digital video;
   a comparison module that retrieves the digital data of the digital video master and the duplicate digital video and performs a data segment-by-data segment comparison between the digital data of the digital video master and the digital data of the duplicate digital video, the comparison module indicating any discrepancies between the digital video master and the duplicate digital video; and
   a user interface for listening to the indicated discrepancies.

9. A system according to claim 8, wherein the comparison module annotates discrepancies in a log file, and the user interface allows selecting an annotated discrepancy and listening to that portion of the duplicate video having the annotated discrepancy.

10. A system according to claim 9, wherein the user interface allows listening to that portion of the digital master that corresponds to the selected annotated discrepancy.

11. A method for inspecting a duplicate digital video tape created from a digital video master, wherein the digital video master and the duplicate digital video tape each contain digital data, the method comprising:

loading digital data of the digital video master and the duplicate digital video tape into memory associated with a processor;
comparing the digital data of the digital master and the duplicate digital video tape in the processor;
identifying each discrepancy in data between the digital data of the master video and the duplicate video tape; and
indicating each discrepancy in data between the digital data of the master video and the duplicate video tape.

12. A method according to claim 11, wherein only those discrepancies above a defined threshold are indicated.

13. A method according to claim 12, wherein the threshold is based upon time over which the data is in discrepancy.

14. A method according to claim 12, wherein the threshold is based upon spatial relationships between discrepancies.

15. A method according to claim 14, wherein the threshold is based upon proximity of discrepancies within a line of video.

16. A method according to claim 14, wherein the threshold is based upon proximity of discrepancies within a field of video.

17. A method according to claim 14, wherein the threshold is based upon proximity of discrepancies within a frame of video.

18. A method according to claim 14, wherein the threshold is based upon viewer perceptibility standards.

19. A method according to claim 14, wherein the threshold is based upon variance in intensity level of the discrepancy.

20. A method according to claim 11, further comprising annotating each discrepancy in a log file.

21. A method according to claim 11, wherein the step of indicating each discrepancy includes identifying the time of the discrepancy.

22. A method according to claim 11, wherein the step of indicating each discrepancy includes categorizing the type and severity of the discrepancy.

23. A method according to claim 11, further comprising:
   providing a user controlled viewing of the indicated discrepancies pertaining to video in the duplicate video.

24. A method according to claim 23, further comprising:
   providing a user controlled auditory review of the indicated discrepancies in the duplicate video.

25. A computer program product for use on a computer system for inspecting a duplicate digital video tape created from a digital video master, wherein the digital video master tape and the duplicate digital video tape each contain digital data, the computer program product comprising a computer usable medium having a computer readable program thereon, the computer readable program code including:
   computer code for loading digital data of the digital video master and the duplicate digital video tape;
   computer code for accessing the digital data of the digital master video and the duplicate digital video;
   computer code for identifying each discrepancy in data between the digital master video and the duplicate digital video tape; and
   computer code for indicating each discrepancy in data between the digital data of the digital master video and the duplicate digital video tape.

26. A computer program product according to claim 25, wherein the computer code indicates only those discrepancies above a defined threshold.

27. A computer program product according to claim 26, wherein the threshold is based upon duration in time over which data is in discrepancy.

28. A computer program product according to claim 27, wherein the threshold is based upon spatial relationships between discrepancies.

29. A computer program product according to claim 28, wherein the threshold is based upon proximity of discrepancies within a line of video.

30. A computer program product according to claim 28, wherein the threshold is based upon proximity of discrepancies within a field of video.

31. A computer program product according to claim 28, wherein the threshold is based upon proximity of discrepancies within a frame of video.

32. A computer program product according to claim 26, wherein the threshold is based upon viewer perceptibility standards.

33. A computer program product according to claim 26, wherein the threshold is based upon variance in intensity level of the discrepancy.

34. A computer program product according to claim 25, further comprising:
computer code for providing user controlled viewing of the indicated discrepancies in the duplicate digital video tape.

35. A computer program product according to claim 25, further comprising:
computer code for providing user controlled auditory review of the indicated discrepancies in the duplicate digital video tape.

36. A computer program product according to claim 25, wherein the process of indicating further comprises:
computer code for determining whether an entire field of video is in discrepancy between the digital master video and the duplicate digital video tape.

37. A computer program product according to claim 25, wherein the process of indicating further comprises:
computer code for determining the severity of discrepancy over time.

38. A method for copying a duplicate digital video from a digital video master and inspecting the duplicate video at substantially the same time, wherein digital data is copied data segment-by-data segment from the digital video master to the duplicate digital video, the method comprising:
reading a data segment from the digital video master;
writing the data segment to the duplicate digital video;
reading the data segment from the duplicate digital video;
comparing the data segment read from the digital video master to the data segment read from the duplicate digital video;
determining if there any discrepancies between the data segment read from the digital video master and the data segment read from the duplicate digital video; and
causing an indicator if any discrepancies are found.

39. A method according to claim 38, wherein each data segment is a byte representative of video.

40. A method according to claim 38, wherein each data segment is representative of a displayed line of video.

41. A method according to claim 38, wherein each data segment is representative of a field of video.

42. A method according to claim 38, wherein each data segment is representative of a frame of video.

43. A method according to claim 38, wherein each data segment is representative of a section of audio track.

44. A method according to claim 38, wherein only those discrepancies above a defined threshold cause an indicator.

45. A method according to claim 44, wherein the threshold is based upon time over which the data is in discrepancy.

46. A method according to claim 44, wherein the threshold is based upon spatial relationships between discrepancies.

47. A method according to claim 46, wherein the threshold is based upon proximity of discrepancies within a line of video.

48. A method according to claim 46, wherein the threshold is based upon proximity of discrepancies within a field of video.

49. A method according to claim 46, wherein the threshold is based upon proximity of discrepancies within a frame of video.

50. A method according to claim 44, wherein the threshold is based upon viewer perceptibility standards.

51. A method according to claim 44, wherein the threshold is based upon variance in intensity level of the discrepancy.

52. A method according to claim 44, further comprising annotating each discrepancy in a log file.

53. A method according to claim 38, wherein the step of causing an indicator includes identifying the time of the discrepancy.

54. A method according to claim 38, wherein the step of causing an indicator includes categorizing the severity of the discrepancy.

55. A method according to claim 38, further comprising:
providing a user controlled viewing of the indicated discrepancies in the duplicate video.

56. A method according to claim 38, further comprising:
providing a user controlled auditory review of the indicated discrepancies in the duplicate video.

57. A method according to claim 38, wherein the process of causing an indicator includes an audio alert.

58. A method according to claim 38, further comprising halting any further copying if a discrepancy is indicated.

* * * * *